US010027572B2

(12) United States Patent
Floberg et al.

(10) Patent No.: US 10,027,572 B2
(45) Date of Patent: Jul. 17, 2018

(54) PATH FINDING IN A MESH NETWORK WITH ADAPTIVE BITRATE

(71) Applicant: Terranet AB, Lund (SE)

(72) Inventors: Henrik Floberg, Lund (SE); Conny Do, Lund (SE); Dag Mårtensson, Flyinge (SE); Johan Petersen, Malmö (SE)

(73) Assignee: TERRANET AB, Lund (SE)

( * ) Notice: Subject to any disclaimer, the term of this patent is extended or adjusted under 35 U.S.C. 154(b) by 50 days.

(21) Appl. No.: 15/028,290

(22) PCT Filed: Oct. 8, 2014

(86) PCT No.: PCT/EP2014/071563
§ 371 (c)(1),
(2) Date: Apr. 8, 2016

(87) PCT Pub. No.: WO2015/052247
PCT Pub. Date: Apr. 16, 2015

(65) Prior Publication Data
US 2016/0269277 A1 Sep. 15, 2016

(30) Foreign Application Priority Data
Oct. 9, 2013 (SE) ...................... 1351195

(51) Int. Cl.
H04J 1/16 (2006.01)
H04L 12/733 (2013.01)
H04W 40/02 (2009.01)
H04L 12/933 (2013.01)
H04W 24/02 (2009.01)
H04W 40/22 (2009.01)
H04W 72/08 (2009.01)
H04L 12/729 (2013.01)
H04W 40/28 (2009.01)
(Continued)

(52) U.S. Cl.
CPC .......... H04L 45/20 (2013.01); H04L 49/1584 (2013.01); H04W 24/02 (2013.01);
(Continued)

(58) Field of Classification Search
None
See application file for complete search history.

(56) References Cited

U.S. PATENT DOCUMENTS 6,236,642 B1 * 5/2001 Shaffer ................... H04L 45/00
370/228
7,911,962 B2 * 3/2011 Khuu .................... H04L 45/125
370/238
(Continued)

FOREIGN PATENT DOCUMENTS

WO 2009144756 A1 12/2009

OTHER PUBLICATIONS

Qiuna Niu: "QoS Routing Scheme for Wirless Mutlimedia Networks Based on UWB", Information Processing (ISIP), 2010 Third International Symposium ON, IEEE, Piscataway, NJ, USA, Oct. 15, 2010.
(Continued)

Primary Examiner — Kwang B Yao
Assistant Examiner — Juvena Loo
(74) Attorney, Agent, or Firm — McNair Law Firm, P.A.

(57) ABSTRACT

A station (100, 330) for use in a mesh network comprising at least one first station (100a) and a second station (100b) wherein the station comprises a controller (210) configured to receive a path request for a path from the first station (100a) to the second station (100b); determine a proposed path between the first station (100a) and the second station (100b); and determine a cost for the proposed path, wherein the controller (210) is characterized in that it is configured to retrieve a number of jumps and a bit rate, and to include the number of jumps and a bit rate in the determination of the cost for the proposed path, wherein an increase in number of jumps and/or decrease in bit rate leads to an increase in cost for the proposed path.

23 Claims, 5 Drawing Sheets

(51) Int. Cl.
  *H04L 12/721* (2013.01)
  *H04W 84/12* (2009.01)
  *H04W 88/04* (2009.01)
  *H04W 88/12* (2009.01)

(52) U.S. Cl.
  CPC ........... *H04W 40/02* (2013.01); *H04W 40/22* (2013.01); *H04W 72/085* (2013.01); *H04L 45/122* (2013.01); *H04L 45/124* (2013.01); *H04L 45/125* (2013.01); *H04Q 2209/43* (2013.01); *H04W 40/28* (2013.01); *H04W 84/12* (2013.01); *H04W 88/04* (2013.01); *H04W 88/12* (2013.01)

(56) References Cited

U.S. PATENT DOCUMENTS

| | | | |
|---|---|---|---|
| 2005/0009028 A1* | 1/2005 | Heintz | C12N 15/1006 435/5 |
| 2005/0041591 A1 | 2/2005 | Duggi et al. | |
| 2008/0280625 A1* | 11/2008 | Larsen | G01S 5/0226 455/456.1 |
| 2009/0163238 A1* | 6/2009 | Rao | H04W 52/225 455/522 |
| 2009/0252134 A1* | 10/2009 | Schlicht | H04L 1/0015 370/338 |
| 2011/0128918 A1* | 6/2011 | Zhai | H04L 45/125 370/328 |
| 2013/0235730 A1 | 9/2013 | Yonge, III et al. | |

OTHER PUBLICATIONS

Jihong Shi, et al.: "AODV Protocol Optimization Based on Cross-Layer Design of WMN", Wireless Communications, Networking and Mobile Computing (WICOM), 2011 7th International Conference ON, IEEE, Sep. 23, 2011.

International Search Report and Written Opinion of corresponding application No. PCT/EP2014/071563, dated Mar. 25, 2015.

* cited by examiner

PATH FINDING IN A MESH NETWORK WITH ADAPTIVE BITRATE

TECHNICAL FIELD

This application relates to a method, a computer-readable medium and a radio frequency communication network device for use in a mesh network, a so-called station, for improved path finding in a mesh network, and in particular to a method, a computer-readable medium and a station for improved path finding in a mesh network for improved power consumption.

BACKGROUND

In mesh networks, such as networks operating according to the IEEE 802.11s standard, handsets, such as mobile phones, operating as stations in the network operate in a mesh mode wherein they may act as repeaters for other stations' communications. This impacts the available bandwidth for a station as the station has to share its bandwidth with other stations' communications in order to relay the communication.

Also, as the relaying or intermediate station receives the communication at a bit rate and then has to relay it but also a response received, the bit rate for the next jump is reduced by 50%. This degradation in bandwidth for the jumps (i.e. number of relaying stations) puts an upper limit to the number of jumps that may be included in a path at a set (starting) bandwidth. Multi-hop bandwidth degradation is at best $1/n$ and at worst $\frac{1}{2}^{n-1}$, where n is the number of hops.

Also, as the link throughput goes down as two stations are moved apart (for a fixed transmission power) the throughput is degraded even more.

There is thus a need for a method and a station that enables for a stable communication network to be maintained and which provides a high quality of service even for stations far apart.

SUMMARY

It is an object of the teachings of this application to overcome the problems listed above. The inventors of this application has realized that as a lower bit rate can work over a larger range, a path should be constructed so that the throughput is maximized, not only with regards to the actual bit rate, but also with regards to the distance of a relaying or intermediate station to the originator of the path, or to a more central intermediate station.

It is thus one object of the teachings herein to provide a station for use in a mesh network comprising at least one first station and a second station, wherein the station comprises a controller configured to receive a path request for a path from the first station to the second station; determine a proposed path between the first station and the second station; and determine a cost for the proposed path, wherein the controller is characterized in that it is configured to retrieve a number of jumps and a bit rate, and to include the number of jumps and a bit rate in the determination of the cost for the proposed path, wherein an increase in number of jumps and/or bit rate leads to an increase in cost for the proposed path.

It is also an object of the teachings of this application to overcome the problems listed above by providing a mesh network comprising a station as above.

It is also an object of the teachings of this application to overcome the problems listed above by providing a method for use in a station for use in a mesh network comprising at least one first station and a second station, wherein the method comprises: receiving a path request for a path from the first station to the second station; determining a proposed path between the first station and the second station; and determining a cost for the proposed path, wherein the method is characterized in that it further comprises retrieving a number of jumps and a bit rate, and to include the number of jumps and a bit rate in the determination of the cost for the proposed path, wherein an increase in number of jumps and/or bit rate leads to an increase in cost for the proposed path.

It is also an object of the teachings of this application to overcome the problems listed above by providing a station for use in a mesh network also comprising at least one other station, wherein the station comprises a controller configured to: determine a distance to the other station; determine if the determined distance is above a reference level; and if so, decrease a bit rate; and if not, increase a bit rate.

It is also an object of the teachings of this application to overcome the problems listed above by providing a station for use in a mesh network also comprising at least one other station, wherein the station comprises a controller configured to: determine a the number of links to other stations; determine if the number of links is above a reference level; and if so, increase a bit rate; and if not, decrease a bit rate.

It is also an object of the teachings of this application to overcome the problems listed above by providing a method for use in a station for use in a mesh network comprising at least one second station, wherein the method comprises: determining a distance to the other station; determining if the determined distance is above a reference level; and if so, decreasing a bit rate; and if not, increasing a bit rate.

It is also an object of the teachings of this application to overcome the problems listed above by providing a method for use in a station for use in a mesh network comprising at least one second station, wherein the method comprises: determining a the number of links to other stations; determining if the number of links is above a reference level; and if so, increasing a bit rate; and if not, decreasing a bit rate.

It is also an object of the teachings of this application to overcome the problems listed above by providing a computer readable storage medium encoded with instructions that, when executed on a processor, performs the method according to above.

The teachings herein also find use in routed mesh networks operating according to the IEEE 802.11s standard. Other examples are WPANs (wireless personal area network) that build on the IEEE 802.15 standard and especially the IEEE 802.15.5 WPAN mesh standard.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figures 1A, 1B:
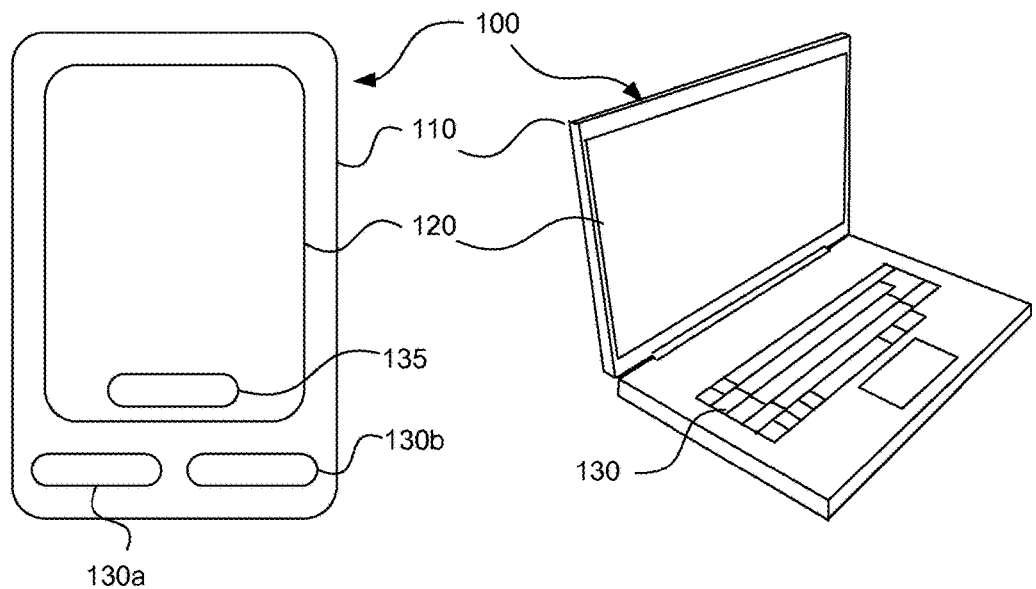
FIG. 1 is a schematic view of a station according to an embodiment of the teachings herein.

FIGS. 1A and 1B generally show a station 100 according to an embodiment herein. In one embodiment the station 100 is configured for wireless or radio frequency network communication for acting as a node in a mesh network. An example of a mesh network will be described with reference to FIG. 3. Examples of such a station 100 are: a personal computer, desktop or laptop, a tablet computer, a mobile telephone, a smart phone and a personal digital assistant.

Two embodiments will be exemplified and described as being a smartphone in FIG. 1A and a laptop computer 100 in FIG. 1B.

Referring to FIG. 1A a smartphone 100 comprises a housing 110 in which a display 120 is arranged. In one embodiment the display 120 is a touch display. In other embodiments the display 120 is a non-touch display. Furthermore, the smartphone 100 comprises two keys 130a, 130b. In this embodiment there are two keys 130, but any number of keys is possible and depends on the design of the smartphone 100. In one embodiment the smartphone 100 is configured to display and operate a virtual key 135 on the touch display 120. It should be noted that the number of virtual keys 135 are dependant on the design of the smartphone 100 and an application that is executed on the smartphone 100.

Referring to FIG. 1B a laptop computer 100 comprises a display 120 and a housing 110. The housing comprises a controller or CPU (not shown) and one or more computer-readable storage mediums (not shown), such as storage units and internal memory. Examples of storage units are disk drives or hard drives. The station 100 further comprises at least one data port. Data ports can be wired and/or wireless. Examples of data ports are USB (Universal Serial Bus) ports, Ethernet ports or WiFi (according to IEEE standard 802.11) ports. Data ports are configured to enable a station 100 to connect with other stations or a server.

The station 100 further comprises at least one input unit such as a keyboard 130. Other examples of input units are computer mouse, touch pads, touch screens or joysticks to name a few.

Figure 2:
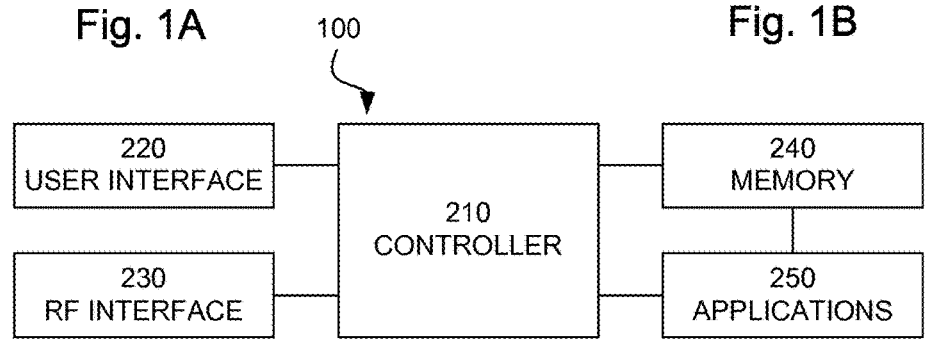
FIG. 2 is a schematic view of the components of a station according to an embodiment of the teachings herein.

FIG. 2 shows a schematic view of the general structure of a station according to FIGS. 1A and 1B. The station 100 comprises a controller 210 which is responsible for the overall operation of the station 100 and is preferably implemented by any commercially available CPU ("Central Processing Unit"), DSP ("Digital Signal Processor") or any other electronic programmable logic device. The controller 210 may be implemented using instructions that enable hardware functionality, for example, by using executable computer program instructions in a general-purpose or special-purpose processor that may be stored on a computer readable storage medium (disk, memory etc) 240 to be executed by such a processor. The controller 210 is configured to read instructions from the memory 240 and execute these instructions to control the operation of the station 100. The memory 240 may be implemented using any commonly known technology for computer-readable memories such as ROM, RAM, SRAM, DRAM, CMOS, FLASH, DDR, SDRAM or some other memory technology. The memory 240 is used for various purposes by the controller 210, one of them being for storing application data and program instructions 250 for various software modules in the station 100. The software modules include a real-time operating system, drivers for a user interface, an application handler as well as various applications 250. The applications are sets of instructions that when executed by the controller 210 control the operation of the station 100. The applications 250 can include a messaging application such as electronic mail, a browsing application, a media player application, as well as various other applications 250, such as applications for voice calling, video calling, document reading and/or document editing, an instant messaging application, a calendar application, a control panel application, one or more video games, a notepad application, Short Message Service applications, location finding applications, electronic mailing and internet browsing applications.

The station 100 may further comprise a user interface 220, which in the station of FIGS. 1A and 1B is comprised of the display 120 and the keys 130, 135.

The station 100 further comprises a radio frequency interface 230, which is adapted to allow the station to communicate with other devices via a radio frequency band through the use of different radio frequency technologies. Examples of such technologies are IEEE 802.11, IEEE 802.11s and Bluetooth® to name a few. Other examples of radio technologies for example for communicating with devices outside the mesh network that may be implemented in a station 100 are W-CDMA, GSM, UTRAN, LTE, NMT to name a few.

Figure 3:
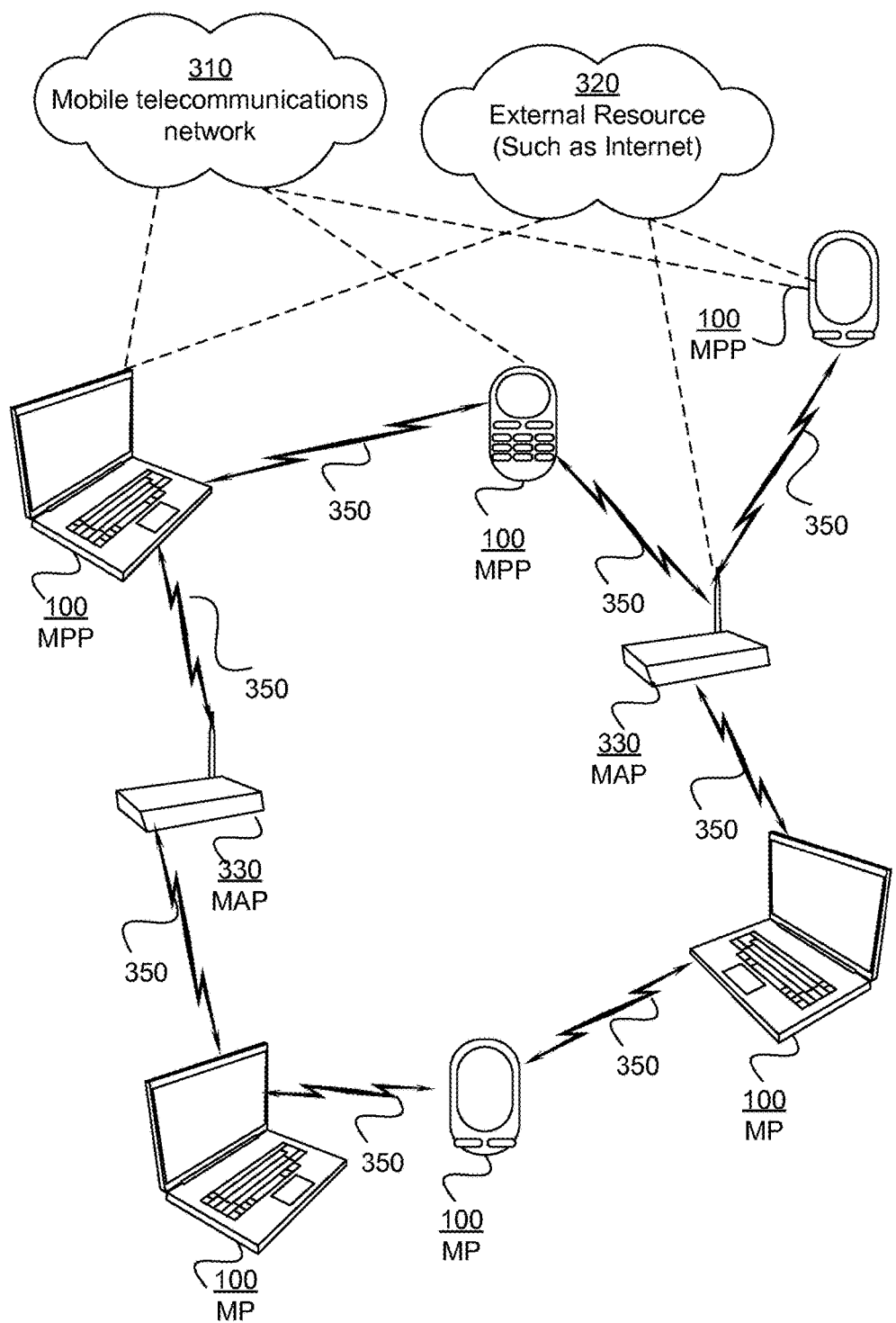
FIG. 3 is a schematic view of a general view of a mesh network according to an embodiment of the teachings herein.

FIG. 3 shows a mesh network 300. A mesh network 300 comprises a plurality of nodes which may be a station 100 as in FIGS. 1A, 1B and 2. The mesh network 300 may also comprise at least one access point 330, referred to as a Mesh Access Point (MAP). A network without any access points 330 is called an ad hoc network. A MAP 330 is also an example of a network node. In a mesh network 300 each node 330, 100 is configured to capture and disseminate data that is aimed for the specific node. Each node 330, 100 is also configured to serve as a relay for other nodes 100, that is, the node 100 must collaborate to propagate data in the network 300. The mesh access points 330 are configured to serve as relays and routers for the other nodes 100. The nodes 330, 100 are configured to connect to one another through links or connections 350.

The network shown in FIG. 3 is a wireless mesh network and the stations 100 and the access points 330 (if any) are configured to establish the wireless links 350 for communicating with one another.

In this example, the mesh network is arranged to operate according to the IEEE 802.11s standard. There are three types of nodes 330, 100 in such a mesh network, namely Mesh Points (MP), Mesh Portal Points (MPP) and Mesh Access Points (MAP).

An MP is often a laptop, smartphone or other wireless device, such as has been disclosed in the above with reference to FIGS. 1A and 1B, and supports a peer protocol for discovering neighboring nodes and maintaining an overview of them. In IEEE 802.11s this peer protocol is called Peer Link Management protocol.

The discovery process is implemented so that a node transmits a beacon. A beacon is a data package that is transmitted periodically and carries information identifying the node transmitting it. Other data carried in the beacon includes Path Selection Protocol ID, Path Selection metric, Congestion Control Mode, Synchronization Protocol ID, Authentication Protocol ID, Mesh Formation Info and Mesh Capability. Nodes 330, 100 in a mesh network receive this information and each node 330, 100 is thus aware of its surrounding network environment.

The MPs also support a protocol for communicating with other nodes, nodes that are not necessarily neighbors to the MP. In IEEE 802.11s this peer protocol is called Hybrid Wireless Mesh Protocol (HWMP). It is hybrid because it supports two kinds of path selection protocols. In IEEE 802.11s the protocols use the MAC addresses for addressing a data package correctly. Each node 330, 100 is configured to find a path from one node 330, 100 to another node 330, 100. This is referred to as path selection.

An MPP is configured to provide gateway functionality to the mesh network. The MPP may for example be a portal to the internet 320 or a communication network 310, such as a mobile telecommunications network. An MPP must thus be configured to bridge at least two interface protocols. An MPP is often a laptop, a cell phone or other wireless device.

A MAP is an access point that is configured to also communicate according to the mesh network standard and to operate as an access point.

In the mesh network 300 of FIG. 3 there are eight nodes 330, 100 whereof three are laptops, three are smartphones and two are routers. Two nodes are MAPs, three nodes are MPs and at least two nodes are MPPs. It should be noted that a node may have the capability to act as both an MP and an MPP. For example, the MPs of the example mesh network of FIG. 3 may actually also be MPPs. For clarity issues, only three nodes are illustrated as having internet capability and three as having capabilities for mobile telecommunication.

A mesh network can be designed using a flooding technique or a routing technique. When using a routing technique, a message propagates from a sending node 100 to receiving node 100 along a path, by hopping from node 100 to node 100 until the receiving node 100 is reached. To ensure that all paths are available, a routing network must allow for continuous connections and reconfiguration around broken or blocked paths, using self-healing algorithms. According to the standard IEEE 802.11s should a path be broken this will be discovered after a time period (5 s) when a sending node detects that reception is not acknowledged. The system then performs a rerouting procedure by sending out path requests (PREQ).

The self-healing capability enables a routing-based network to operate when one node breaks down or if a connection goes bad. As a result, the network is typically quite reliable, as there is often more than one path between a source and a destination in the network. Although mostly used in wireless scenarios, this concept is also applicable to wired networks and software interaction.

A wireless mesh network (WMN) is a communications network made up of radio nodes (laptops, cell phones and other wireless devices) while the mesh routers forward traffic to and from the gateways which may but need not connect to the Internet. The coverage area of the radio nodes working as a single network is sometimes called a mesh cloud. Access to this mesh cloud is dependent on the radio nodes working in harmony with each other to create a radio network. A mesh network is reliable and offers redundancy. When one node can no longer operate, the rest of the nodes can still communicate with each other, directly or through one or more intermediate nodes. Wireless mesh networks can be implemented with various wireless technology including 802.11, 802.15, 802.16, cellular technologies or combinations of more than one type.

A wireless mesh network often has a more planned configuration, and may be deployed to provide dynamic and cost effective connectivity over a certain geographic area. An ad-hoc network, on the other hand, is formed ad hoc when wireless devices come within communication range of each other. The MAPs may be mobile, and be moved according to specific demands arising in the network. Often the MAPs are not limited in terms of resources compared to other nodes in the network and thus can be exploited to perform more resource intensive functions. In this way, the wireless mesh network differs from an ad-hoc network, since these nodes are often constrained by resources.

Figure 4:
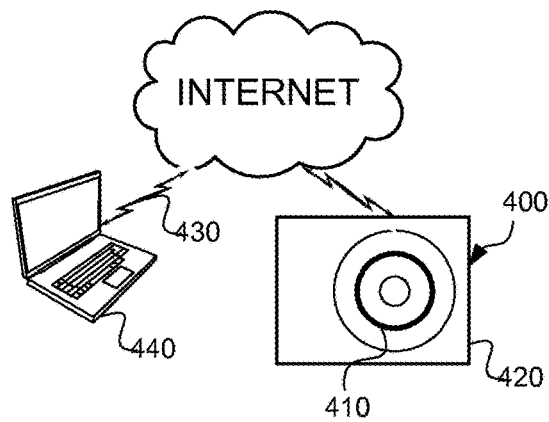
FIG. 4 is a schematic view of a computer-readable storage medium according to an embodiment of the teachings herein.

FIG. 4 shows a schematic view of a computer-readable medium as described in the above. The computer-readable medium 400 is in this embodiment a data disc 400. In one embodiment the data disc 400 is a magnetic data storage disc. The data disc 400 is configured to carry instructions 410 that when loaded into a controller, such as a processor, executes a method or procedure according to the embodiments disclosed above. The data disc 400 is arranged to be connected to or within and read by a reading device 420, for loading the instructions into the controller. One such example of a reading device 420 in combination with one (or several) data disc(s) 400 is a hard drive. It should be noted that the computer-readable medium can also be other mediums such as compact discs, digital video discs, flash memories or other memory technologies commonly used.

The instructions 410 may also be downloaded to a computer data reading device 440, such as a computer or other device capable of reading computer coded data on a computer-readable medium, by comprising the instructions 410 in a computer-readable signal 430 which is transmitted via a wireless (or wired) interface (for example via the Internet) to the computer data reading device 440 for loading the instructions 410 into a controller. In such an embodiment the computer-readable signal 43 is one type of a computer-readable medium 400.

The instructions may be stored in a memory (not shown explicitly in FIG. 4, but referenced 240 in FIG. 2) of the computer 440.

References to computer program, instructions, code etc. should be understood to encompass software for a programmable processor or firmware such as for example, the programmable content of a hardware device, instructions for a processor, or configuration settings for a fixed-function device, gate array or programmable logic device etc.

In the description below there will not be made any distinction between which component of a mesh point or a station that performs which action. As would be apparent to a person skilled in data stations, some tasks may be implemented to be performed by several different components and to list all the possible alternatives would only serve to cloud the issues at hand.

Figure 5A:
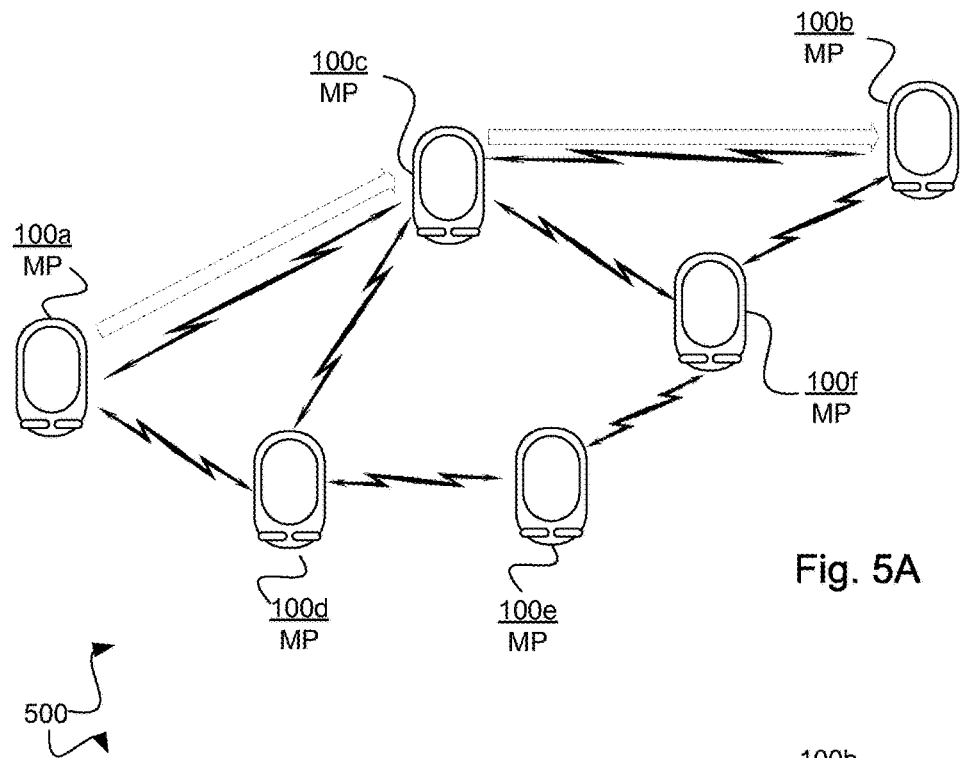
FIGS. 5A, and 5B each shows an example of an example mesh network according to an embodiment of the teachings herein.

FIG. 5A shows a mesh network 500 comprising six stations 100a, 100b, 100c, 100d, 100e and 100f, which may be implemented as a station 100 of FIG. 1A (or 1B). The stations are connected via a wireless link (indicated by dashed arrows) to each other and are, in one embodiment, arranged to operate according to the wireless communication standard IEEE802.11s. Other standards that the stations 100a-f may be arranged to operate according to are WPANs (wireless personal area network) that build on the IEEE 802.15 standard and especially the IEEE 802.15.5 WPAN mesh standard.

A first station 100a is connected to a second station 100b through a path hopping from one station to another in the mesh network of FIG. 5A. In the example of FIG. 5A the path from the first station 100a to the second station 100b goes through a third station 100c. The path is indicated by the dashed arrows.

As a path is to be determined, such as when a new station has entered the mesh network, a station has been removed from the network or when a link is otherwise broken, a path request message is sent out by the first station 100a for finding a path to the second station 100b. As should be clear, any station in the network 500 may perform such a path request. The path requests are forwarded by intermediate stations until a path to the second station 100b has been found. A path response message is then sent along the path to the first station 100a.

To determine which path to be used a cost function may be used which takes into account various factors such as available bandwidth of an intermediate node or station. In one embodiment, the cost of the path so far is propagated along with the path request and as an intermediate station receives the path request, it determines its own cost and adds this to the propagated cost and forwards the cost along with the path request.

One example is a cost function which takes into account a number of different parameters such as bit rate, RSSI value, latency, jitter and packet loss. The cost function for a mesh link between handset nodes A and B can be expressed as $$C_{AB} = \sum_i c_i * f_i(x^j_{AB})$$

which is the weighted sum of the individual metric functions, $c_i$ being the weights, $f_i$ being the metric functions and $x^i_{AB}$ being a path relevant parameter. Examples of such metric functions are known in the art and will not be discussed further herein.

The cost function is normalized if the individual metric functions $f_i$ are normalized and $$\sum_i c_i = 1$$

For voice applications we get for the cost C for a path between station A (such as station 100a in FIG. 5A) and station B (such as station 100b in FIG. 5A):

$$C_{AB} = c_1 * f_1(\text{number of hops}_{AB}) + c_2 * f_2(\text{bit rate}_{AB}) + c_3 * f_3(\text{RSSI}_{AB}) + c_4 * f_4(\text{latency}_{AB}) + c_5 * f_5(\text{jitter}_{AB}) + c_6 * f_6(\text{packet loss}_{AB})$$

Figure 5B:
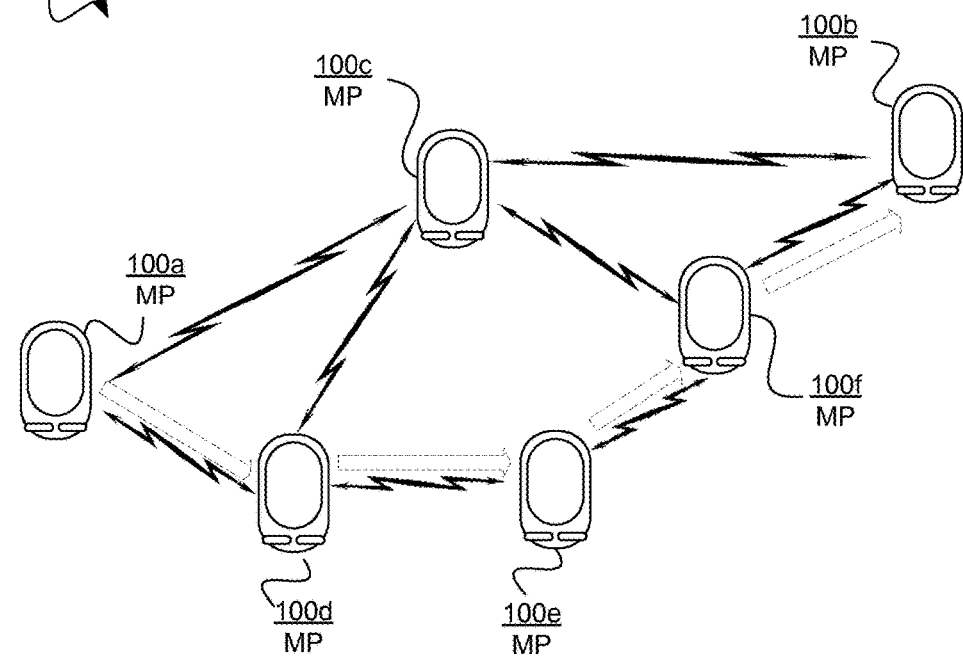

Should the cost for a path, as in FIG. 5A, return a too high cost, the path from the first station 100a to the second station 100b, may be rerouted through other intermediate stations, such as in FIG. 5B, where the intermediate station 100c is no longer included in the path, but the traffic is routed through the intermediate stations 100d, 100e, 100f and 100g as is indicated by the dashed arrows.

Figure 6:
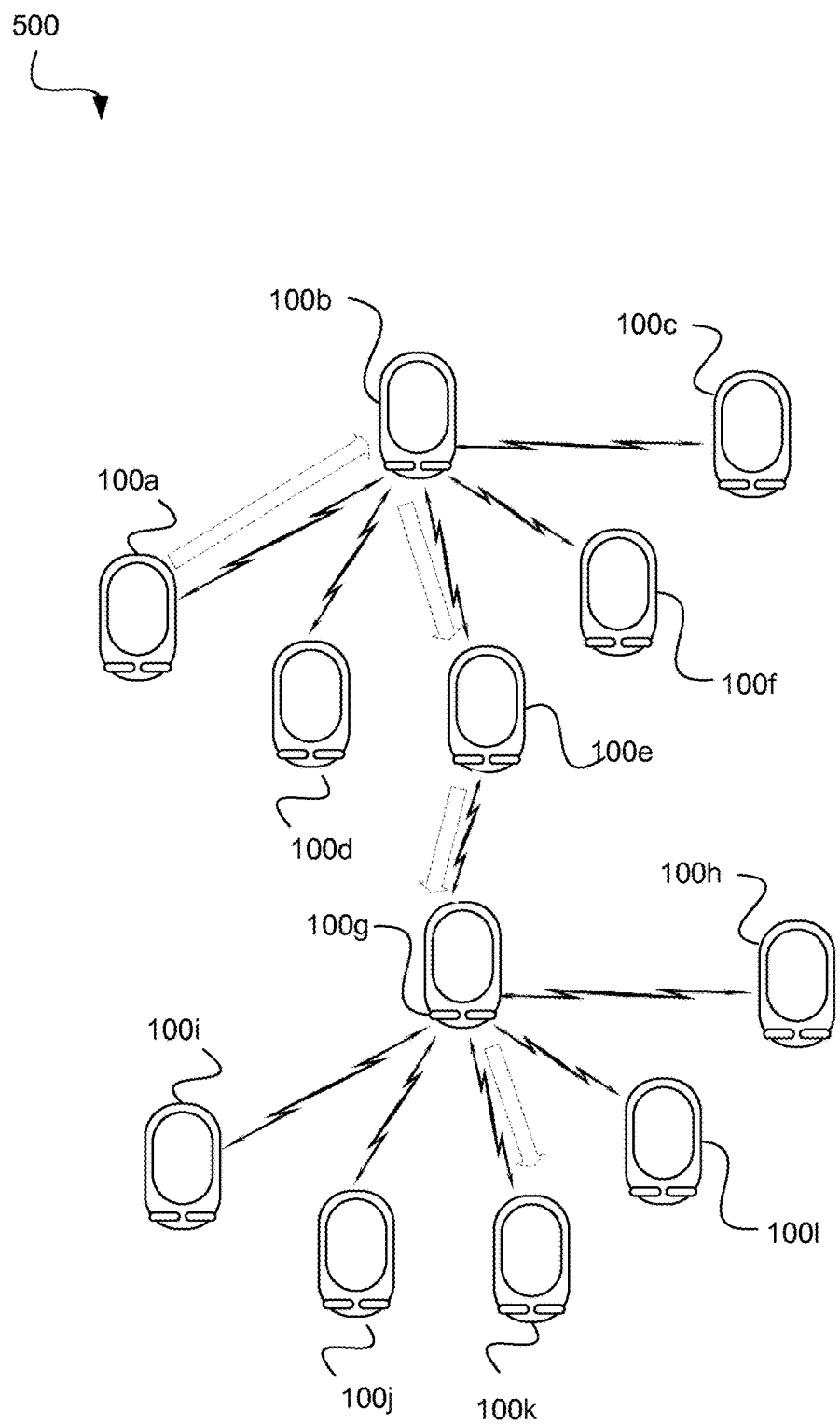
FIG. 6 shows an example of an example mesh network according to an embodiment of the teachings herein.

FIG. 6 shows an example of a mesh network 500 where a first or transmitting station 100a is trying to establish a path to a second or receiving station 100k. The path request is propagated through the network from one intermediate station to another until it ends up at the receiving station 100k. It should be noted that even though only stations 100b and 100e are shown to have further links, more of the other stations may also have more links.

As has been discussed in the above, the available bandwidth for the intermediate station 100b will be divided among the five stations 100a, 100c, 100d, 100e, 100f. In other words, the available bandwidth BW is divided among the linked stations so that the bandwidth for each link $BW_i$ becomes $BW_i = BW/N$, N being the number of links.

The inventors have also realized that in order to maximize the throughput and quality of service for the mesh network, the inventors propose a solution that takes into account the available bit rate and also the number of jumps to the sending station, or alternatively to a central station. In this manner, the stations close to a central station 100b or sending station 100a are arranged to operate at higher bit rates, whereas the stations that are further away (in number of jumps) will operate at lower bit rates, which will also extend their range. Another benefit is that the stations at a center of a cluster in the network will be arranged to operate at high bitrates (taking the short distances into account which probably exist in a cluster), whereas the stations that are far remote, will be arranged to operate at lower bitrates (thereby providing a longer reach extending the mesh network). A cluster may be signified by that there will be a number of stations connected to each other, whereby the stations are all connected to several other stations. The number of links for a relaying station may thus also be relevant to determine a path.

The inventors therefore propose to introduce a new metric function into the cost function which takes into account the number of hops or jumps, and the bit rate of a transmitting station 100 when determining the cost of a path:

$$c_k * f_k(\text{number of hops}_{AB}, \text{bit rate}_{AB})$$

One example of such a metric function is $f(n, BR) = 2^n * 54$ Mbps*/BR, where n is the number of hops, and BR is the bit rate in Mbps.

The function will give an increase in cost if the number of hops is increased and/or the bit rate is decreased, i.e. a simultaneous change or a change of one while the other is kept stable.

In one embodiment, the number of hops is the number of hops from the sending station to the receiving station.

In one embodiment, the number of hops is the number of hops from the sending station to a central intermediate mesh point and/or the number of hops from the central intermediate mesh point to the receiving station.

In one embodiment, the number of links is also to be included in the cost function. That is, the function below will be included in the cost function:

$$c_k * f_k(\text{number of hops}_{AB}, \text{bit rate}_{AB}, \text{number of links}_{AB})$$

In such an embodiment the cost will increase with an increasing number of links. In one embodiment, the number of links is the number of links for each intermediate station, i.e. a propagated sum that is propagated and added to by each intermediate station the path request travels through. In one embodiment, the number of links is the number of links for a central intermediate station.

A central intermediate station may be identified as a station having more than a threshold number of stations connected to it.

A central intermediate station may be identified or replaced by the quota of the bit rate and the number of links, i.e. in such an embodiment the cost is based on the quota between the bit rate and the number of links. The function to be included in the cost function becomes:

$$c_k * f_k(\text{number of hops}_{AB}, \text{bit rate}_{AB}/\text{number of links}_{AB})$$

The controller is thus configured to determine the cost by including a cost associated with the relaying station in a propagated cost. And, as the cost will increase for a relaying station $100b$, that has a high number of links, other paths will be found (if any) and prioritized, thereby distributing the bandwidth needs more evenly across the mesh network and also enabling the coverage of the mesh network to be extended as remote stations are enabled to operate at lower bit rates and therefore longer ranges, at the same power consumption.

Figures 7, 8:
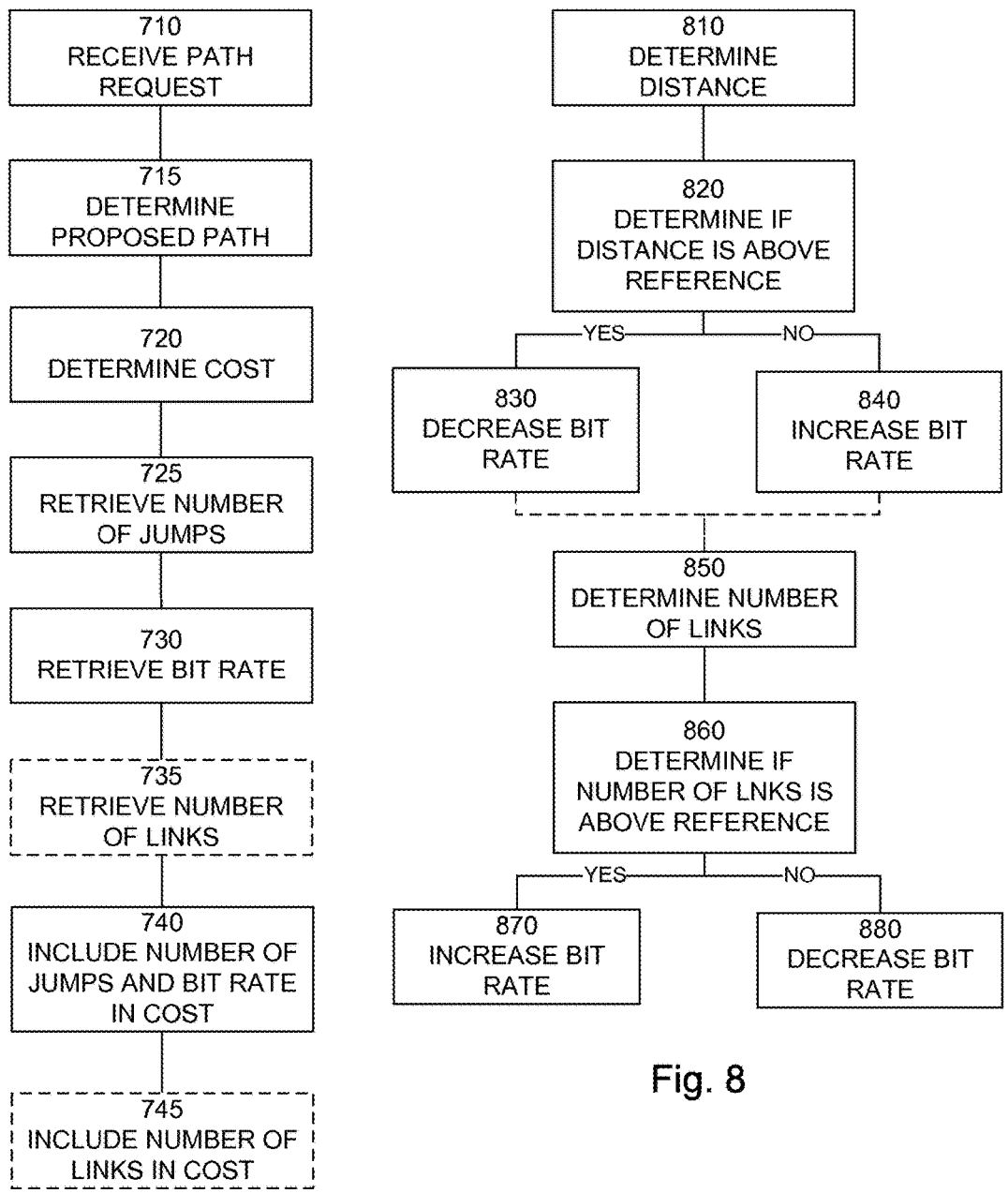
FIG. 7 is a flowchart of a general method according to an embodiment of the teachings herein.
FIG. 8 is a flowchart of a general method according to an embodiment of the teachings herein.

FIG. 7 shows a flowchart of a general method according to the teachings herein for use in a mesh point (such as the stations 100 and 330 of FIGS. 1, 2, and 3).

The station 100 is configured to receive 710 a path request and determine a possible or proposed path 715. The possible or proposed path may be determined as being part of the path request including the station. The station further determines a cost 720 for the proposed path. To do this, the station retrieves the number of jumps 725 to a central station or to a sending station and the station also retrieves the bit rate 730 of the station 100. The station 100 may also retrieve 735 the number of links for the station. This is a further option which is indicated by the dashed lines. The bit rate may be retrieved from the station itself or from a server or access point indicating a desired bit rate for the station. The number of jumps may be retrieved from the path request.

The station 100 thereafter includes 740 the retrieved number of jumps and the retrieved bit rate in the determination of the cost.

A station may be configured to set its bit rate according to a distance to another station. The distance may be communicated between the stations by comparing geographical (or network) positions. The distance may also be determined through the number of jumps. In this manner a remote station may extend its own range—and thereby also the range of the mesh network—and a central station may increase its bit rate increasing the throughput of the system.

FIG. 8 shows a flowchart of a general method according to the teachings herein for use in a mesh point (such as the stations 100 and 330 of FIGS. 1, 2, and 3).

A station 100 determines 810 a distance from the station to a second station 100 and determines 820 if the determined distance is above a reference level and, if so, decreases 830 a bit rate, and if not, increases 840 the bit rate. The distance may be determined as a received signal strength, comparison of geographical (or network) appositions, or from the number of jumps to another station.

The reference level may be 4 jumps in one embodiment. The reference level may also be a previous number of jumps. This will enable a station to dynamically adapt its bit rates as a station is moved.

The station may also or alternatively determines 850 the number of links for the station, and determines 860 if the determined distance is above a reference level and, if so, increases 870 a bit rate, and if not, decreases 880 the bit rate.

The reference level may be 4 links in one embodiment. The reference level may also be a previous number of links. This will enable a station to dynamically adapt its bit rates as links are formed or lost.

The novel cost function disclosed herein also has the benefit that the network capacity is increased by using higher bit rates close to the mesh points. The range is also extended by using lower bit rates farther away from the mesh points.

We optimize the network for latency and packet error rate and not only for throughput in order to improve quality of service (i.e. voice call quality).

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An intermediate station for use in a mesh network comprising at least one first station and a second station wherein the intermediate station comprises a controller configured to
   receive a path request for a path from the first station to the second station;
   determine a proposed path between the first station and the second station; and
   determine a cost for the proposed path, wherein the controller is further configured to retrieve a number of jumps, a number of links and a bit rate, and to include the number of jumps, the number of links, and the bit rate in the determination of the cost for the proposed path, wherein an increase in number of jumps and/or increase in number of links and/or decrease in bit rate leads to an increase in cost for the proposed path,
   wherein the retrieved number of links is a total number of links to each intermediate station on the proposed path, such that each intermediate station adds its number to the total number of links.

2. The intermediate station of claim 1, wherein said controller is further configured to
   determine the number of links from the intermediate station to other stations in the mesh network;
   determine if the number of links is above a reference level; and if so,
   increase the bit rate; and if not,
   decrease the bit rate.

3. The intermediate station of claim 1, wherein said controller is further configured to retrieve the number of jumps from the path request.

4. The intermediate station of claim 1, wherein the number of jumps is to the first station.

5. The intermediate station of claim 1, wherein the number of jumps is to a central station.

6. The intermediate station of claim 1, wherein the bit rate is the bit rate of the intermediate station.

7. The intermediate station of claim 1, wherein the bit rate received is a desired bit rate.

8. The intermediate station according to claim 7, wherein the controller is further configured to propagate the cost determined to another station as part of a path request.

9. The intermediate station according to claim 8, wherein the intermediate station is a mobile communications terminal, such as a mobile phone, a laptop or a tablet computer.

10. The intermediate station of claim 1, wherein the controller is further configured to
    determine a distance from the intermediate station to the second station;
    determine if the determined distance is above a reference level; and if so,
    decrease the bit rate; and if not,
    increase the bit rate.

11. A mesh network comprising an intermediate station for use in a mesh network comprising at least one first station and a second station wherein the intermediate station comprises a controller configured to
    receive a path request for a path from the first station to the second station;
    determine a proposed path between the first station and the second station; and
    determine a cost for the proposed path, wherein the controller is configured to
    determine a distance from the intermediate station to the second station;
    determine if the determined distance is above a reference level; and if so,
    decrease a bit rate; and if not,
    increase the bit rate; and
    determine a number of links from the intermediate station to other stations in the mesh network;
    determine if the number of links is above a reference link level; and if so,
    increase the bit rate; and if not
    decrease the bit rate; and
    retrieve a number of jumps, the number of links and the bit rate, and to include the number of jumps, the number of links and the bit rate in the determination of the cost for the proposed path, wherein an increase in number of jumps and/or increase in number of links and/or decrease in bit rate leads to an increase in cost for the proposed path.

12. The mesh network of claim 11, wherein the retrieved number of links is a total number of links to each intermediate station on the proposed path, such that each intermediate station adds its number of links to the total number of links.

13. The mesh network of claim 11, wherein said controller is further configured to retrieve the number of jumps from the path request.

14. The mesh network of claim 11, wherein the number of jumps is to the first station.

15. The mesh network of claim 11, wherein the number of jumps is to a central station.

16. The mesh network of claim 11, wherein the bit rate is the bit rate of the intermediate station.

17. The mesh network of claim 11, wherein the bit rate received is a desired bit rate.

18. The mesh network of claim 17, wherein the controller is further configured to propagate the cost determined to another station as part of a path request.

19. The mesh network of claim 18, wherein the intermediate station is a mobile communications terminal, such as a mobile phone, a laptop or a tablet computer.

20. A method for use in an intermediate station for use in a mesh network comprising at least one first station and a second station, wherein the method comprises:
    receiving a path request for a path from the first station to the second station;
    determining a proposed path between the first station and the second station; and
    determining a cost for the proposed path, wherein the method further comprises
    retrieving a number of jumps, a number of links and a bit rate, and to include the number of jumps, the number of links, and the bit rate in the determination of the cost for the proposed path, wherein an increase in number of jumps and/or increase in the number of links and/or decrease in bit rate leads to an increase in cost for the proposed path,
    wherein the retrieved number of links is a total number of links to each intermediate station on the proposed path, such that each intermediate station adds its number to the total number of links.

21. The method according to claim 20, further comprising:
    determining the number of links from the intermediate station to other stations in the mesh network;
    determining if the number of links is above a reference level; and if so,
    increasing a bit rate; and if not,
    decreasing a bit rate.

22. A non-transitory computer readable storage medium encoded with instructions that, when executed on a processor, performs a method in an intermediate station in a mesh network comprising at least one first station and a second station, wherein the method comprises:
    receiving a path request for a path from the first station to the second station;
    determining a proposed path between the first station and the second station; and
    determining a cost for the proposed path, wherein the method further comprises retrieving a number of jumps, a number of links and a bit rate, and to include the number of jumps, the number of links, and the bit rate in the determination of the cost for the proposed path, wherein an increase in number of jumps and/or increase in the number of links and/or decrease in bit rate leads to an increase in cost for the proposed path,
    wherein the retrieved number of links is a total number of links to each intermediate station on the proposed path, such that each intermediate station adds its number to the total number of links.

23. The computer readable storage medium of claim 22, wherein the method further comprises:
    determining the number of links from an intermediate station to other stations in the mesh network;
    determining if the number of links is above a reference level; and if so,
    increasing a bit rate; and if not,
    decreasing a bit rate.

* * * * *